(No Model.)
T. H. STONE.
CAR AXLE BEARING.
No. 358,499. Patented Mar. 1, 1887.
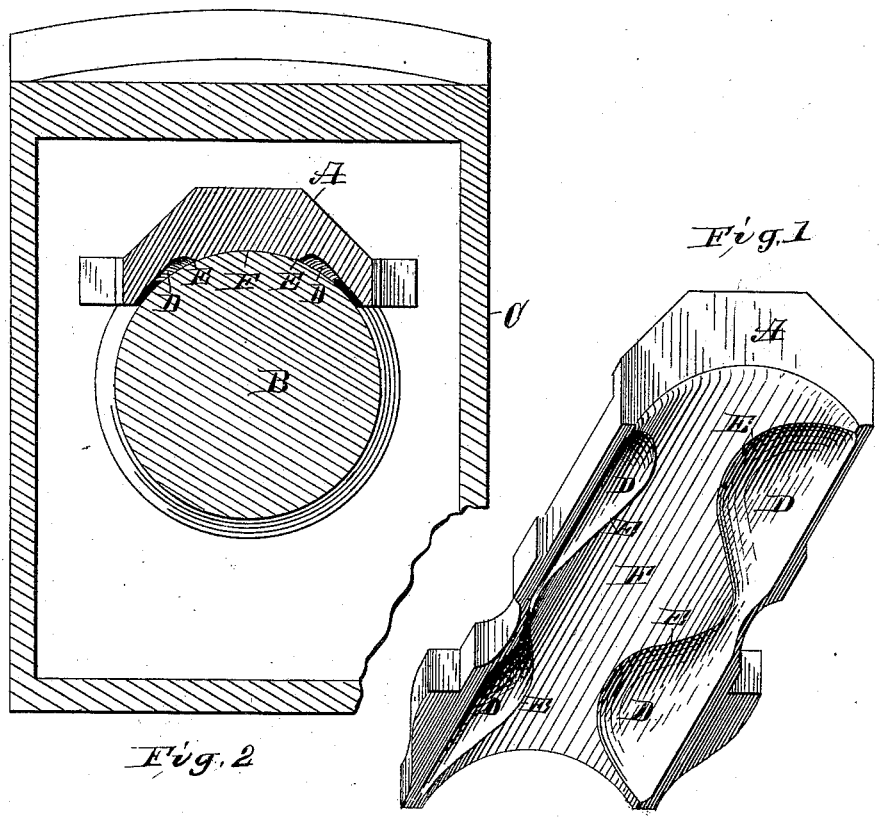
Witnesses
G. M. Gridley
E. R. Inman
Inventor
Thomas H. Stone
By Erwin Benedict
Attorneys

UNITED STATES PATENT OFFICE.

THOMAS H. STONE, OF MILWAUKEE, WISCONSIN.

CAR-AXLE BEARING.

SPECIFICATION forming part of Letters Patent No. 358,499, dated March 1, 1887.

Application filed June 17, 1886. Serial No. 205,403. (No model.)

*To all whom it may concern:*

Be it known that I, THOMAS H. STONE, of Milwaukee, in the county of Milwaukee and State of Wisconsin, have invented new and useful Improvements in Car-Axle Bearings; and I do hereby declare the following to be a full, clear, and exact description of said invention, reference being had to the accompanying drawings, and to the letters or figures of reference marked thereon, which form a part of this specification.

My invention relates to that class of bearings that are supported by and ride on the axle; and it consists in the peculiar construction of the bearing, whereby provision is made for receiving and retaining the lubricant and for its application to the axle on its upper surface, where it is in contact with the bearing.

The straight, sharp, angular, lower inner edge of the ordinary segmental concave or arched bearing heretofore in use, the edge of which fitted close upon the axle, seems too successfully to catch and turn back the lubricant taken up by the axle from the box or reservoir in which it revolves, not permitting any, or, at most, not much, lubricant to pass beneath the bearing upon the axle, whereby the axle and bearing have been liable to heat and unduly expand, to the detriment of the car service. This difficulty my invention is intended to obviate.

In the accompanying drawings, Figure 1 is a perspective of the under inner surface of my improved bearing. Fig. 2 is a vertical cross-section of my improved bearing at about one-fourth of the distance from one end to the other, also showing the car-axle and box in cross-section.

In the drawings, A is the bearing. B is the axle. C is the journal-box, which journal-box is adapted to hold a supply of oil or other lubricant and cotton waste or other absorbent, which lubricant comes up about the axle, so that the axle revolves in the lubricant, and as it revolves takes up a supply to lubricate the part that in its revolution is in contact with the bearing A.

The bearing is provided on both sides, in its lower inner surface, with a recess or recesses, D D, which recesses are so shaped as when the bearing is on the axle to form a chamber or chambers about the axle having a downwardly-opening mouth along the lower inner edge of the bearing, through which the lubricant taken up by the axle in its revolution enters the chambers on that side of the bearing toward the upwardly forward revolution of the axle. The upper rear part of the chamber is preferably somewhat deeper than the lower front part, and the upper rear walls, E E, of the chambers are preferably curved in outline longitudinally and inclined or beveled off vertically inwardly toward the axle, so that the edge of the surface of the bearing A, adapted to come in actual contact with the axle, has along the coexistent line of edge with the rear walls, E E, of recesses D D a small or acute angle, whereby the lubricant adhering to the axle is as slightly as possible scraped off the revolving axle, and is as much as possible permitted to follow the axle and enter under the surface F of the bearing A.

The chambers formed by the recesses D and the axle are also adapted, by reason of their shallow mouths, to retain and remain filled with the lubricant carried up into them on the surface of the axle in its revolutions, thereby providing an ample supply of lubricant close to the bearing-surface F, which lubricant so held in supply is more surely appropriated to lubricating the bearing than when a supply is not so held near by the parts requiring lubrication.

I do not wish to confine myself to one recess on each side of the bearing, as two or more recesses of a similar form will accomplish the same purpose as one recess.

What I claim as new, and desire to secure by Letters Patent, is—

The car-axle bearing A, having recesses D D in its lower inner edges for the reception of a lubricant, the rear walls of which recesses are beveled off or inclined, substantially as described.

In testimony whereof I affix my signature in presence of two witnesses.

THOMAS H. STONE.

Witnesses:
 C. T. BENEDICT,
 E. R. INMAN.